United States Patent Office 3,755,512
Patented Aug. 28, 1973

3,755,512
3-DIALKOXYPHOSPHORYLTHIO-ACRYLAMIDES AND RELATED COMPOUNDS
Horst O. Bayer, Levittown, and William S. Hurt, Norristown, Pa., assignors to Rohm and Haas Company, Philadelphia, Pa.
No Drawing. Filed July 12, 1971, Ser. No. 162,009
Int. Cl. C07f *9/06, 9/16;* C07d *87/46*
U.S. Cl. 260—970                17 Claims

ABSTRACT OF THE DISCLOSURE

A novel method for preparing 3-dialkoxyphosphorylthio and 3 - dialkoxythionophosphorylthio-acrylamides, crotonamides, methacrylamides and related compounds which consists of opening a 3-isothiazolone ring with a dialkyl phosphite or an O,O-dialkyl thionophosphite in the presence of a basic catalyst.

---

This invention is concerned with a novel method for preparing 3-dialkoxyphosphorylthio- and 3-dialkoxythionophosphorylthio-acrylamides and related structures of the formula:

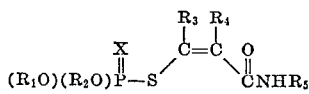

wherein $R_1$ and $R_2$ are independently selected from alkyl of 1 to 5 carbon atoms, haloalkyl of 1 to 5 carbon atoms or alkenyl of 3 to 5 carbon atoms;
$R_3$ is hydrogen or methyl;
$R_4$ is hydrogen, halogen or alkyl of 1 to 5 carbon atoms;
$R_5$ is selected from the group consisting of hydrogen, alkyl of 1 to 12 carbon atoms, alkyl substituted with halogen, cyano, phenyl, morpholinyl, anilino optionally substituted with halogen or nitro, hydroxy or alkoxy, alkylthio or carboalkoxy groups of 1 to 5 carbon atoms, alkenyl of 3 to 12 carbon atoms, alkynyl of 3 to 12 carbon atoms, cycloalkyl of 3 to 6 carbon atoms, phenyl, phenyl substituted with halogen, alkyl of 1 to 5 carbon atoms, nitro or lower alkylsulfonyl, benzyl optionally substituted with halogen, alkyl of 1 to 5 carbon atoms or nitro, the —C(O)$R_6$ group wherein $R_6$ is hydrogen, alkyl of 1 to 5 carbon atoms, alkyl or chloroalkyl of 1 to 5 carbon atoms, phenyl, alkoxy of 1 to 5 carbon atoms or lower alkylamino; and
X is oxygen or sulfur.

When the term "lower" is employed with alkyl, alkylsulfonyl, alkylamino and the like, it is intended to indicate that the alkyl or alkyl portion thereof has a carbon content of 1 to 5 carbon atoms.

The method consists in reaction of a $$(R_1O)(R_2O)P(X)H$$

compound, i.e., a dialkyl phosphite, $(R_1O)(R_2O)P(O)H$, or a dialkyl thionophosphite, $(R_1O)(R_2O)P(S)H$, with a 3-isothiazolone of the structure:

wherein X, $R_1$, $R_2$, $R_3$, $R_4$ and $R_5$ have the meanings given above, in the presence of a basic catalyst and preferably in a solvent. The reaction may be depicted as follows:

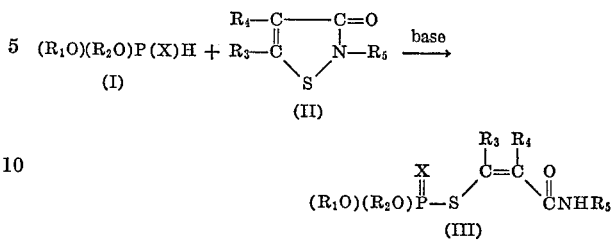

The compounds of Formula III as produced are of the cis-configuration, i.e., the phosphorylthio group, $$(R_1O)(R_2O)P(X)S-$$

and the carbamyl group, —C(O)NHR$_5$, are on the same side of the vinylene, —C($R_3$=C($R_4$)— group. This presents no problem with nomenclature when $R_3$ is hydrogen, and the compounds are named as the cis-structures. When $R_3$ is methyl, however, the compounds are crotonamides and in accordance with the accepted nomenclature for crotonamides are named as trans-structures to indicate that the methyl ($R_3$) group and the carbamyl (—C(O)NHR$_5$) group are on opposite sides of the vinylene group. The cis-structure of Formula III as written above applies for all of the acrylamides, crotonamides, etc. produced by the novel method of this invention.

The dialkyl phosphites and thionophosphites used as one of the raw materials are known compounds whose chemistry is described in Houben-Weyl, vol. 12/2, Organische Phosphorverbindungen, edited by E. Muller, published by G. Thieme, Stuttgart, 1964. Such phosphites suitable for use in this invention include:

dipropyl phosphite
diisopropyl phosphite
dibutyl phosphite
diisobutyl phosphite
di-sec-butyl phosphite
diallyl phosphite
dipentyl phosphite
methyl propyl phosphite
methyl butyl phosphite
methyl amyl phosphite
ethyl isopropyl phosphite
O,O-dimethyl thionophosphite
O,O-dipropyl thionophosphite
O,O-dibutyl thionophosphite
O-ethyl O-methyl thionophosphite
O-amyl O-methyl thionophosphite
bis(2-chloropropyl) phosphite
bis-(4-chlorobutyl) phosphite
2-chloroethyl methyl phosphite
bis-(2-chloroethyl) thionophosphite
dimethallyl phosphite
allyl methyl phosphite
diallyl thionophosphite The 3-isothiazolone intermediates are also known compounds. A listing of such structures may be found in U.S. Pat. 3,523,121. They can be prepared by the reaction of a substituted disulfide-amide and a halogenating agent as described, for example, in British Pat. 1,224,661. A number of these structures where $R_5$ is acyl are described by Chan and Crow in Australian Journal of Chemistry, 21, 2967 (1968).

It is known in the literature that dialkyl phosphites will react in a nucleophilic manner in the presence of basic catalysts. A discussion of this may be found in R. F. Hudson's Structure and Mechanism in Organo-Phosphorus Chemistry, vol. 6, chapter 5 on Nucleophilic Reactions of Phosphines, Academic Press, London and New York, 1965. However, there is no teaching in the literature that a dialkyl phosphite or thionophosphite can be used to open an isothiazolone ring.

Nucleophilic attack to open an isothiazolone ring is also known. For example, Crow and Leonard in the Journal of Organic Chemistry, 30, 2660 (1965) describe the cleavage of a 3-isothiazolone at the S—N bond by such agents as cyanide or sulfite ions, sodium thiophenolate, sodium t-butyl mercaptide or hydrogen cyanide. Related nuclephilic attack on N-ethyl-3-isothiazolone in the presence of a base with a number of carbanions such as those derived from ethyl cyanoacetate, diethyl malonate, nitromethane or acetone to produce cis-3-(substituted-mercapto)-N-ethyl acrylamides are known from the work of Crow and Gosney, Australian Journal of Chemistry, 22, 765 (1969). In no instance, however, is there recorded an attempt to open the isothiazolone ring by means of a dialkyl phosphite.

The preferred general process is to stir a 3-isothiazolone, 0.5–5.0 mole percent of an organic base and an inert solvent until solution has occurred. Then one equivalent of the dialkyl phosphite or thionophosphite in the same solvent is added dropwise with stirring at such a rate that the exotherm does not exceed 40° C. Stirring is continued for an additional hour and then the solvent removed in vacuo to give the product as a crystalline solid and usually in essentially quantitative yield.

The progress of the reaction may readily be followed by spectroscopic examination using nmr or infrared. Usually the reaction is quite rapid with reaction times of 1 to 24 hours preferred.

Suitable inert solvents which may be used include alcohols, such as methanol or isopropanol; ketones, such as acetone or methyl ethyl ketone; esters, such as ethyl acetate or propyl formate; ethers, such as diethyl ether or dioxane; aliphatic and aromatic hydrocarbons, such as toluene or n-octane; and acetonitrile. The more polar solvents are preferred. When $R_5$ is acyl group, a formyl group in particular, aprotic solvents are preferred since aprotic solvent often results in elimination of the acyl group. The reaction may be run under heterogeneous conditions provided that either the starting materials or the final product is essentially completely soluble.

The basic catalysts may be organic or inorganic. These include tertiary amines, such as triethylamine or N,N,N'N' - tetramethylethylenediamine; heterocyclic amines, such as pyridine or N-methylmorpholine; sodium and potassium alkoxides, such as sodium methoxide or potassium ethoxide; and alkali carbonates and hydroxides. Organic bases are preferred. Base concentrations in excess of 5 mole percent may be used, but lower concentrations are preferred in order to minimize side reactions.

The reaction proceeds at a temperature range of 0° C. to 100° C.; however, the preferred range is 20° C. to 40° C. In most instances, an exotherm occurs when all of the reactants have been combined but is usually not of a violent nature and may be controlled by cooling.

The order of addition of the three reactants, i.e., the dialkyl phosphite or thionophosphite, the 3-isothiazolone and the basic catalyst is not critical. They may be added in any order. An excess of the dialkyl phosphite or thionophosphite may be used, but excesses greater than 10% may be detrimental.

The products as isolated are usually crystalline solids of high purity. They may readily be purified by recrystallization. In the few instances where the products are oily, other common means of purification, such as chromotography, may be used.

The following examples are offered to illustrate the method of preparation of this invention and are not to be construed as limitations thereof.

EXAMPLE 1

Preparation of cis-3-dimethoxyphosphorylthio-acrylamide

Seven drops of triethylamine was added to a solution of 3.03 g. (0.03 mole) of 3-hydroxyisothiazole and 3.3 g. (0.03 mole) of dimethyl phosphite in 75 ml. of methanol. A slight exotherm occurred. The solution was stirred 45 min. and then concentrated in vacuo to give a solid which after recrystallization from chloroform was 5.2 g. of white crystals. This is an 82% yield of cis-3-dimethoxyphosphorylthioacrylamide.

EXAMPLE 6

Preparation of cis-3-dimethoxyphosphorylthio-N-cyclopentylacrylamide

Ten drops of triethylamine was added to a slurry of 4.2 g. (0.025 mole) of 2-cyclopentyl-3-isothiazolone in a solution of 3.08 g. (0.0275 mole) of dimethyl phosphite and 125 ml. of ethyl acetate. Over a period of 10 min. there was a slight exotherm which resulted in a 2° C. rise in temperature as the solid completely dissolved. The solution was stirred an additional 2 hours then concentrated in vacuo to give a light brown solid. After recrystallization from ethyl acetate, this was 4.6 g. and was a 66% yield of cis-3-dimethoxyphosphorylthio-N-cyclopentyl-acrylamide.

EXAMPLE 8

Preparation of trans-3-diethoxyphosphorylthio-N-methylcrotonamide

Seven drops of triethylamine was added to a solution of 2.6 g. (0.02 mole) of 2,5-dimethyl-3-isothiazolone and 2.8 g. (0.02 mole) of diethyl phosphite in 75 ml. of methanol. The solution was stirred for 45 minutes then concentrated in vacuo to give a solid. This was recrystallized from 20 ml. of a 3:1 ether:ethyl acetate solution to give 3.4 g. of crystals. This was a 63% yield of trans-3-diethoxyphosphorylthio - N - methylcrotonamide.

EXAMPLE 9

Preparation of cis-3-dimethoxyphosphorylthio-2-bromoacrylamide

To a solution of 4.5 g. (0.025 mole) of 4-bromo-3-hydroxyisothiazole and 2.75 g. (0.025 mole) of dimethyl phosphite in 150 ml. of methanol was added 10 drops of triethylamine. There was a slight exotherm. After stirring 16 hours, an NMR examination indicated that a reaction had occurred. The reaction mixture was concentrated in vacuo to give a medium brown oil residue. This was triturated with 20 ml. of hot ethyl acetate to give 5.4 g. of soluble light brown oil and 1.8 g. of insoluble dark brown oil. The soluble fraction was taken up in 20 ml. of ethyl acetate and allowed to crystallize by standing at room temperature. This gave 2.1 g. of white crystals which is a 29% yield of cis-3-dimethoxyphosphorylthio-2-bromoacrylamide.

EXAMPLE 10

Preparation of cis-3-dimethoxyphosphorylthio-2-methyl-N-ethylacrylamide (a) To a solution of 4.3 g. (0.03 mole) of 2-ethyl-4-methyl-3-isothiazolone and 3.6 g. (0.033 mole) of dimethyl phosphite in 75 ml. of methanol was added dropwise with stirring 0.084 g. (0.0015 mole) of sodium methoxide in 10 ml. of methanol. An immediate exotherm resulted in a temperature rise from 25° C. to 35° C. The reaction mixture was stirred an additional 45 min. then concentrated in vacuo to give a solid which after recrystallization from 15 ml. of ethyl acetate was 5.9 g. of white crystals. This was a 78% yield of cis-3-dimethoxyphosphorylthio-2-methyl-N-ethylacrylamide.

(b) The above preparation was repeated using 100 ml. of acetone in place of methanol as the solvent and 10 drops of triethylamine instead of the methanolic solution of sodium methoxide as the catalyst. After recrystallization from ethyl acetate, there was obtained 6.7 g. of white crystals which was an 88% yield of cis-3-dimethoxyphosphylthio-2-methyl-N-ethylacrylamide.

EXAMPLE 16

Preparation of cis-3-dimethoxyphosphorylthio-N-(4-morpholinylmethyl)acrylamide

To 2-(4-morpholinylmethyl)-3-isothiazolone (10 g., 0.05 mole) and 10 drops of triethylamine in 125 ml. of methanol was added dropwise dimethyl phosphite (6.15 g., 0.055 mole) in 25 ml. of methanol in 15 minutes. The reaction mixture was then stirred for 2 hours and concentrated in vacuo to give a tan solid. This was recrystalized from 150 ml. of acetone to give 8.4 g. of light tan crystals. This was a 54% yield of cis-3-dimethoxyphosphorylthio-N-(4-morpholinylmethyl)acrylamide.

EXAMPLE 27

Preparation of cis-3-dimethoxyphosphorylthio-N-formylacrylamide

To a slurry of 5.65 g. (0.044 mole) of 2-formyl-3-isothiazolone in 125 ml. of ethyl acetate was added 5 drops of triethylamine. To this was added dimethyl phosphite (5.6 g., 0.05 mole) in 25 ml. of ethyl acetate. There was no exotherm. The reaction mixture was stirred 20 hours at room temperature and then stripped to about one-half volume and crystals appeared. The mixture was then heated to reflux to give a solution which was then allowed to stand at room temperature. There was obtained 8.0 g. of light yellow crystals which was a 76% yield of cis-3-dimethoxyphosphorylthio-N-formylacrylamide.

EXAMPLE 31

Preparation of cis-3-dimethoxyphosphorylthio-N-butyrylacrylamide

To 2-butyryl-3-isothiazolone (5.2 g., 0.03 mole) and 10 drops of triethylamine in 125 ml. of toluene was added dropwise dimethyl phosphite (3.6 g., 0.033 mole) in 25 ml. of toluene. After 0.5 hour a product separated as a very flocculent solid. After stirring another 0.5 hour, the solid was filtered off. This amount to 5.0 g. of a white solid and was a 58% yield of cis-3-dimethoxyphosphorylthio-N-butyrylacrylamide.

EXAMPLE 33

Preparation of cis-3-(ethoxy)methoxyphosphorylthio-N-formylacrylamide

To a slurry of 2-formyl-3-isothiazolone (6.5 g., 0.05 mole) in 125 ml. of ethyl acetate containing 13 drops of pyridine was added dropwise ethyl methyl phosphite (6.8 g., 0.055 mole) in 25 ml. of ethyl acetate. A solution resulted. This was stirred 2 hours at room temperature then stripped to give a clear oil which solidified on standing. This was recrystallized from 30 ml. of a solution of equal volumes of ethyl acetate and ethyl ether to give 7.9 g. of white crystals. This was a 62% yield of cis-3-(ethoxy)-methoxyphosphorylthio - N - formylacrylamide.

EXAMPLE 38

Preparation of cis-3-dimethoxyphosphorylthio-N-hydroxymethylacrylamide

To a slurry of 2-hydroxymethyl-3-isothiazolone (3.93 g., 0.03 mole) and 7 drops of triethylamine in 175 ml. of tetrahydrofuran was added dimethyl phosphite (3.3 g., 0.03 mole) in 25 ml. of tetrahydrofuran. After stirring 0.5 hour a solution resulted. The reaction mixture was stirred an additional 2 hours than allowed to stand overnight. The solvent was then stripped off leaving 7.2 g. of an oil. By NMR this was shown to be essentially pure cis-3-dimethoxyphosphorylthio - N - hydroxymethylacrylamide.

EXAMPLE 40

Preparation of cis-3-diethoxythionophosphorylthio-N-ethylacrylamide

To a solution of 2.58 g. (0.02 mole) of 2-ethyl-3-isothiazolone and 10 drops of triethylamine in 75 ml. of ethanol was added dropwise a solution of 3.4 g. (0.022 mole) of O,O-diethyl thionophosphite in 25 ml. of ethanol. There was an exotherm from 20° C. to 33° C. The solution was stirred an additional hour and then concentrated in vacuo to give 6 g. of a crystalline solid. This is a quantitative yield of cis-3-diethoxythionophosphorylthio-N-ethylacrylamide.

EXAMPLE 43

Preparation of cis-3-diethoxythionophosphorylthio-N-formylacrylamide

To a solution of 2-formyl-3-isothiazolone (2.6 g., 0.02 mole) and 5 drops of triethylamine in 75 ml. of acetonitrile was added O,O-diethyl thionophosphite (3.2 g., 0.02 mole) in 25 ml. of acetonitrile. A slight exotherm ensued after which the solution was stirred at room temperature for 2 hours. The reaction mixture was stripped to give 5.8 g. of a clear oily residue, which was shown by NMR to the essentially pure cis-3-diethoxythionophosphorylthio-N-formylacrylamide.

Table I below gives typical preparations of 3-dialkoxyphosphorylthio-acrylamides and related amides made by this method. Table II below gives typical 3-dialkoxythionophosphorylthioacrylamides and methacrylamides made by the general procedure of this invention. Table III gives analytical data of the examples given in Tables I and II.

TABLE I

| Ex. | $R_1$ | $R_2$ | $R_3$ | $R_4$ | $R_5$ | Melting point (° C.) |
|---|---|---|---|---|---|---|
| 1 | $CH_3$ | $CH_3$ | H | H | H | 113.5–115. |
| 2 | $CH_3$ | $CH_3$ | H | H | $C_2H_5$ | 76–77. |
| 3 | $CH_3$ | $CH_3$ | H | H | sec-$C_4H_9$ | 92.5–94.5. |
| 4 | $CH_3$ | $CH_3$ | H | H | $(C_2H_5)_2CH$ | 78–80. |
| 5 | $CH_3$ | $CH_3$ | H | H | $(n-C_3H_7)(CH_3)CH$ | 62–65. |
| 6 | $CH_3$ | $CH_3$ | H | H | Cyclopentyl | 106–110. |
| 7 | $CH_3$ | $CH_3$ | $CH_3$ | H | $CH_3$ | 67–69. |
| 8 | $C_2H_5$ | $C_2H_5$ | $CH_3$ | H | $CH_3$ | ca. 25. |
| 9 | $CH_3$ | $CH_3$ | H | Br | H | 88.5–91.5. |
| 10 | $CH_3$ | $CH_3$ | H | $CH_3$ | $C_2H_5$ | 97–99. |
| 11 | $CH_3$ | $CH_3$ | H | $CH_3$ | sec-$C_4H_9$ | 98.5–100.5. |
| 12 | $CH_3$ | $CH_3$ | H | $CH_3$ | $(C_2H_5)_2CH$ | 73–75. |
| 13 | $CH_3$ | $CH_3$ | H | $CH_3$ | $(n-C_3H_7)(CH_3)CH$ | Oil. |
| 14 | $CH_3$ | $CH_3$ | H | $C_2H_5$ | $C_2H_5$ | 61–63. |
| 15 | $CH_3$ | $CH_3$ | H | n-$C_4H_9$ | $CH_3$ | Oil. |
| 16 | $CH_3$ | $CH_3$ | H | H | 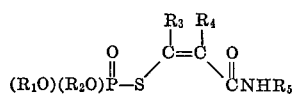 | 128–30. |

TABLE I—Continued

| Ex. | R₁ | R₂ | R₃ | R₄ | R₅ | Melting point (° C.) |
|---|---|---|---|---|---|---|
| 17 | CH₃ | CH₃ | H | H | 4-ClC₆H₄NHCH₂ | 126-128. |
| 18 | CH₃ | CH₃ | H | H | 4-O₂NC₆H₄NHCH₂ | 151-153. |
| 19 | CH₃ | CH₃ | H | H | C₆H₅CH₂CH₂ | 100-102. |
| 20 | CH₃ | CH₃ | H | CH₃ | C₆H₅ | 108-110. |
| 21 | CH₃ | CH₃ | H | H | 2-ClC₆H₄ | 137-41. |
| 22 | CH₃ | CH₃ | H | H | 3-ClC₆H₄ | 119-21. |
| 23 | CH₃ | CH₃ | H | H | 4-ClC₆H₄ | 157-60. |
| 24 | CH₃ | CH₃ | H | H | 4-O₂NC₆H₄ | 200-6 (dec.). |
| 25 | CH₃ | CH₃ | H | H | 4-CH₃O₂SC₆H₄ | 166-68. |
| 26 | CH₃ | CH₃ | H | H | C₂H₅O(O)C | 102-4. |
| 27 | CH₃ | CH₃ | H | H | H(O)C | 104-106. |
| 28 | CH₃ | CH₃ | H | H | CH₃(O)C | 80-2. |
| 29 | CH₃ | CH₃ | H | H | ClCH₂(O)C | 147-148. |
| 30 | CH₃ | CH₃ | H | H | C₂H₅(O)C | 136-138. |
| 31 | CH₃ | CH₃ | H | H | n-C₃H₇(O)C | 90-92. |
| 32 | CH₃ | CH₃ | H | H | C₆H₅(O)C | 110-112. |
| 33 | CH₃ | CH₃ | H | H | H(O)C | 83.5-85.5. |
| 34 | C₂H₅ | C₂H₅ | H | H | H(O)C | 82-84.5. |
| 35 | n-C₃H₇ | n-C₃H₇H | H | H | H(O)C | 83-85. |
| 36 | ClCH₂CH₂ | ClCH₂CH₂ | H | H | H(O)C | 63-65. |
| 37 | CH₃ | CH₃ | H | CH₃ | H(O)C | 107-109. |
| 38 | CH₃ | CH₃ | H | H | CH₂OH | Syrup. |
| 39 | Allyl | Allyl | H | H | H | 80-81. |
| 40 | CH₃ | CH₃ | CH₃ | H | H(O)C | 106-108. |

TABLE II

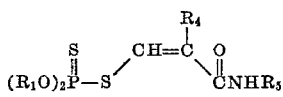

| Example | R₁ | R₄ | R₅ | Melting point (° C.) |
|---|---|---|---|---|
| 41 | C₂H₅ | H | C₂H₅ | 42-44 |
| 42 | C₂H₅ | CH₃ | C₂H₅ | Oil |
| 43 | C₂H₅ | H | H(O)C | Oil |

Table IV gives the identity and a physical characteristic of the 3-isothiazolones used in preparing the above examples.

TABLE IV

Isothiazolone Intermediates

| Used in Example | R₃ | R₄ | R₅ | Melting point or boiling point* (° C.) |
|---|---|---|---|---|
| 1 | H | H | H | 75-76. |
| 2 | H | H | C₂H₅ | 72/0.25 mm.* |
| 3 | H | H | sec-C₄H₉ | 84-85. |
| 4 | H | H | (C₂H₅)₂CH | 86-87/0.1 mm.* |

TABLE III
Elemental Analysis Found (Calculated) for the Various Examples

| Example | Empirical formula | C | | H | | N | | P | | S | | Halogen | |
|---|---|---|---|---|---|---|---|---|---|---|---|---|---|
| 1 | C₅H₁₀NO₄PS | 28.4 | (28.4) | 5.0 | (4.8) | 6.5 | (6.5) | 14.4 | (14.7) | 15.6 | (15.2) | | |
| 2 | C₇H₁₄NO₄PS | 35.6 | (35.1) | 5.9 | (5.9) | 6.0 | (5.9) | 12.4 | (12.9) | 13.8 | (13.4) | | |
| 3 | C₉H₁₈NO₄PS | 40.7 | (40.4) | 7.1 | (6.8) | 5.4 | (5.2) | 11.2 | (11.6) | 11.9 | (12.9) | | |
| 4 | C₁₀H₂₀NO₄PS | 42.6 | (42.7) | 7.1 | (7.2) | 4.9 | (5.0) | 11.0 | (11.6) | 11.5 | (11.4) | | |
| 5 | C₁₀H₂₀NO₄PS | 42.5 | (42.7) | 7.5 | (7.2) | 5.0 | (5.0) | 10.3 | (11.0) | 11.1 | (11.4) | | |
| 6 | C₁₀H₁₈NO₄PS | 42.8 | (43.0) | 6.6 | (6.5) | 4.8 | (5.0) | 10.8 | (11.1) | 11.6 | (11.5) | | |
| 7 | C₇H₁₄NO₄PS | 35.5 | (35.1) | 6.1 | (5.9) | 5.9 | (5.9) | 12.5 | (12.9) | 13.2 | (13.4) | | |
| 8 | C₉H₁₈NO₄PS | 40.3 | (40.4) | 7.3 | (6.8) | 5.2 | (5.2) | 11.3 | (11.6) | 12.1 | (12.0) | | |
| 9 | C₅H₉BrNO₄PS | 21.1 | (20.7) | 3.1 | (3.1) | 4.8 | (4.8) | 10.1 | (10.7) | 11.5 | (11.1) | Br 27.7 | Br (27.5) |
| 10 | C₈H₁₆NO₄PS | 38.2 | (37.9) | 6.4 | (6.3) | 5.6 | (5.5) | 11.7 | (12.2) | 12.7 | (12.7) | | |
| 11 | C₁₀H₂₀NO₄PS | 42.7 | (42.7) | 7.5 | (7.2) | 5.1 | (5.0) | 10.6 | (11.0) | 11.5 | (11.4) | | |
| 12 | C₁₁H₂₂NO₄PS | 45.0 | (44.7) | 7.8 | (7.5) | 4.8 | (4.7) | 10.3 | (10.5) | 10.8 | (10.9) | | |
| 13 | C₁₁H₂₂NO₄PS | 41.7 | (44.7) | 7.6 | (7.5) | 4.3 | (4.7) | 10.7 | (10.5) | 9.9 | (10.9) | | |
| 14 | C₉H₁₈NO₄PS | 40.1 | (40.4) | 6.9 | (6.8) | 5.2 | (5.2) | 11.2 | (11.6) | 12.1 | (12.0) | | |
| 15 | C₁₀H₂₀NO₄PS | 39.8 | (42.7) | 6.7 | (7.2) | 4.5 | (5.0) | 9.9 | (11.0) | 10.7 | (11.4) | | |
| 16 | C₁₀H₁₉N₂O₅PS | 38.6 | (38.7) | 6.3 | (6.2) | 8.8 | (9.0) | 9.6 | (10.0) | 10.5 | (10.3) | | |
| 17 | C₁₂H₁₆ClN₂O₄PS | 41.3 | (41.1) | 4.7 | (4.6) | 7.8 | (8.0) | 8.7 | (8.8) | 9.1 | (9.1) | Cl 10.1 | Cl (10.1) |
| 18 | C₁₂H₁₆N₃O₆PS | 40.5 | (39.9) | 4.3 | (4.5) | 11.8 | (11.7) | 8.3 | (8.6) | 8.8 | (8.9) | | |
| 19 | C₁₃H₁₈NO₄PS | 49.6 | (49.5) | 5.9 | (5.8) | 4.2 | (4.4) | 9.7 | (9.8) | 10.4 | (10.2) | | |
| 20 | C₁₂H₁₆NO₄PS | 47.9 | (47.8) | 5.4 | (5.4) | 4.6 | (4.7) | 10.1 | (10.3) | 10.8 | (10.6) | | |
| 21 | C₁₁H₁₃ClNO₄PS | 41.4 | (41.1) | 4.3 | (4.1) | 4.5 | (4.4) | 9.2 | (9.6) | 9.7 | (10.0) | Cl 11.4 | Cl (11.0) |
| 22 | C₁₁H₁₃ClNO₄PS | 41.3 | (41.1) | 4.2 | (4.1) | 4.2 | (4.4) | 9.3 | (9.6) | 9.9 | (10.0) | 11.2 | (11.0 |
| 23 | C₁₁H₁₃ClNO₄PS | 41.6 | (41.1) | 4.5 | (4.1) | 4.4 | (4.4) | 9.2 | (9.6) | 9.9 | (10.0) | 11.2 | (11.0) |
| 24 | C₁₁H₁₃N₂O₆PS | 40.1 | (39.8) | 4.0 | (3.9) | 8.4 | (8.4) | 8.5 | (9.3) | 9.8 | (9.6) | | |
| 25 | C₁₂H₁₆NO₆PS₂ | 39.6 | (39.4) | 4.5 | (4.4) | 3.7 | (3.8) | 8.0 | (8.5) | 18.0 | (17.6) | | |
| 26 | C₈H₁₄NO₆PS | 34.2 | (33.9) | 5.0 | (5.0) | 4.9 | (5.0) | 10.7 | (10.9) | 11.3 | (11.3) | | |
| 27 | C₆H₁₀NO₅PS | 30.4 | (30.1) | 4.2 | (4.2) | 5.7 | (5.9) | 12.7 | (13.0) | 13.7 | (13.4) | | |
| 28 | C₇H₁₂NO₅PS | 33.2 | (33.4) | 4.8 | (4.8) | 5.4 | (5.5) | 12.1 | (12.2) | 12.8 | (12.7) | | |
| 29 | C₇H₁₁ClNO₅PS | 29.6 | (29.2) | 4.1 | (3.8) | 4.7 | (4.9) | 10.6 | (10.8) | 11.3 | (11.2) | Cl 12.7 | Cl (12.3) |
| 30 | C₈H₁₄NO₅PS | 36.4 | (36.0) | 5.5 | (5.3) | 5.3 | (5.2) | 11.6 | (11.8) | 12.0 | (12.0) | | |
| 31 | C₉H₁₆NO₅PS | 38.1 | (38.4) | 5.7 | (5.7) | 4.9 | (5.0) | 11.0 | (11.0) | 11.6 | (11.4) | | |
| 32 | C₁₂H₁₄NO₅PS | 45.4 | (45.7) | 4.5 | (4.5) | 4.4 | (4.4) | 9.7 | (9.8) | 10.6 | (10.2) | | |
| 33 | C₇H₁₂NO₅PS | 33.2 | (33.2) | 4.9 | (4.8) | 5.4 | (5.5) | 12.1 | (12.2) | 12.7 | (12.7) | | |
| 34 | C₈H₁₄NO₅PS | 35.9 | (36.0) | 5.6 | (5.3) | 5.3 | (5.2) | 11.7 | (11.8) | 12.0 | (12.0) | | |
| 35 | C₁₀H₁₈NO₅PS | 40.6 | (40.7) | 6.1 | (6.1) | 4.7 | (4.7) | 10.5 | (10.5) | 11.1 | (10.9) | | |
| 36 | C₈H₁₂Cl₂NO₅PS | 28.8 | (28.6) | 3.4 | (3.6) | 4.2 | (4.2) | 9.3 | (9.2) | 9.5 | (9.5) | Cl 10.9 | Cl (21.1) |
| 37 | C₇H₁₂NO₅PS | 33.2 | (33.2) | 5.0 | (4.8) | 5.5 | (5.5) | 11.7 | (12.2) | 12.7 | (12.7) | | |
| 38 | C₆H₁₂NO₅PS | 30.0 | (29.9) | 5.3 | (5.0) | 5.8 | (5.8) | 12.6 | (12.8) | 13.4 | (13.3) | | |
| 39 | C₉H₁₄NO₄PS | 41.3 | (41.1) | 5.5 | (5.4) | 5.3 | (5.3) | 11.6 | (11.8) | 12.2 | (12.2) | | |
| 40 | C₇H₁₂NO₅PS | 33.4 | (33.2) | 4.9 | (4.8) | 5.4 | (5.3) | 11.8 | (12.2) | 12.7 | (12.7) | | |
| 41 | C₉H₁₈NO₃PS₂ | 38.3 | (38.1) | 6.5 | (6.4) | 5.0 | (4.9) | 10.4 | (10.9) | 22.6 | (22.6) | | |
| 42 | C₁₀H₂₀NO₃PS₂ | 39.4 | (40.4) | 6.5 | (6.8) | 4.6 | (4.7) | 9.7 | (10.4) | 21.6 | (21.6) | | |
| 43 | C₈H₁₄NO₄PS₂ | 32.8 | (33.9) | 4.9 | (5.0) | 5.0 | (4.9) | 10.1 | (10.9) | 20.8 | (22.6) | | |

TABLE IV—Continued

Isothiazolone Intermediates

| Used in Example | R₃ | R₄ | R₅ | Melting point or boiling point* (° C.) |
|---|---|---|---|---|
| 5 | H | H | (n-C₃H₇)(CH₃)CH | 90–91/0.15 mm.* |
| 6 | H | H | Cyclopentyl | 116–117. |
| 7 | CH₃ | H | CH₃ | 58–66/0.025 mm.* |
| 9 | H | Br | H | 193–195. |
| 10 | H | CH₃ | C₂H₅ | 80–90/0.1–0.6 mm.* |
| 11 | H | CH₃ | sec-C₄H₉ | 94–96/0.1 mm.* |
| 12 | H | CH₃ | (C₂H₅)₂CH | 80–81/0.05 mm.* |
| 13 | H | CH₃ | (n-C₃H₇)(CH₃)CH | 81–82/0.05 mm.* |
| 14 | H | C₂H₅ | C₂H₅ | 67–69/0.1 mm.* |
| 15 | H | n-C₄H₉ | CH₃ | 93–95/0.2 mm.* |
| 16 | H | H | 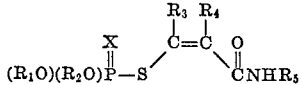 | 114–115. |
| 17 | H | H | 4-ClC₆H₄NHCH₂ | 93–94. |
| 18 | H | H | 4-NO₂C₆H₄NHCH₂ | 196–197. |
| 19 | H | H | C₆H₅CH₂CH₂ | 77.5–78.5. |
| 20 | H | CH₃ | C₆H₅ | 102–104. |
| 21 | H | H | 2-ClC₆H₄ | 90–91. |
| 22 | H | H | 3-ClC₆H₄ | 119–122. |
| 23 | H | H | 4-ClC₆H₄ | 142–144. |
| 24 | H | H | 4-O₂NC₆H₄ | 170–175. |
| 25 | H | H | 4-CH₃SO₂C₆H₄ | 189–190. |
| 26 | H | H | C₂H₅O(O)C | 124–126. |
| 27 | H | H | H(O)C | 126–127. |
| 28 | H | H | CH₃(O)C | 95.5–97.5. |
| 29 | H | H | ClCH₂(O)C | 107–109. |
| 30 | H | H | C₂H₅(O)C | 132–134. |
| 31 | H | H | n-C₃H₇(O)C | 56–59. |
| 32 | H | H | C₆H₅(O)C | 108–110. |
| 37 | H | CH₃ | H(O)C | 150–152. |
| 38 | H | H | HOCH₂ | 125–127. |
| 40 | CH₃ | H | H(O)C | 93–95. |

The 3-dialkoxyphosphorylthio- and 3-dialkoxythionophosphorylthio - acrylamides, crotonamides, methacrylamides and related structures prepared by the novel method of this invention possess general utility as arthropodicides, in particular against members of the class Arachroidea, which includes the order Acarina, as represented by mites and ticks, and Insecta, the insects. Compounds of this invention also have utility as nematocides. Such utilities enable protection of plants and animals, including man, from the ravages of harmful and/or annoying pests or disease organisms which they may carry. Application of said compounds may be made directly to the loci of those pests to be controlled or to the loci to be protected. For example, food, fiber, forage, forest, and ornamental crops and stored products thereof would represent plant protection loci. Treatment with compounds of this invention of domestic animals, man and their immediate environs similarly constitute representative loci for protection against various annoying ectoparasitic or endoparasitic Acarina (Acari) and Insecta. Accordingly compounds of the present invention provide utility as the essential active ingredient of pesticidal compositions suitable for agricultural and sanitary purposes.

We claim:

1. A method for preparing a compound of the formula $$(R_1O)(R_2O)\overset{X}{\underset{\|}{P}}-S\overset{R_3}{\underset{}{\diagup}}\overset{}{\underset{}{C}}=\overset{R_4}{\underset{}{C}}\overset{O}{\underset{\|}{\diagdown}}\overset{}{\underset{}{CNHR_5}}$$

having the cis-configuration, wherein

R₁ and R₂ are independently selected from alkyl straight or branched of 1 to 5 carbon atoms, haloalkyl straight or branched of 1 to 5 carbon atoms, or alkenyl of 3 to 5 carbon atoms;

R₃ is hydrogen or methyl;

R₄ is hydrogen, halogen or alkyl straight or branched of 1 to 5 carbon atoms;

R₅ is selected from the group consisting of hydrogen, alkyl straight or branched of 1 to 12 carbon atoms, alkyl of 1 to 12 carbon atoms substituted with (a) halogen, (b) cyano, (c) phenyl, (d) morpholinyl, (e) anilino, (f) anilino substituted with halogen or nitro, (g) hydroxy, (h) alkoxy, (i) alkylthio or (j) carboalkoxy, alkenyl of 3 to 12 carbon atoms, alkynyl of 3 to 12 carbon atoms, cycloalkyl of 3 to 6 carbon atoms, phenyl, phenyl substituted with (a) halogen, (b) alkyl, (c) nitro or (d) alkylsulfonyl, benzyl, benzyl substituted with (a) halogen, (b) alkyl or (c) nitro, a —C(O)R₆ group, wherein R₆ is (a) hydrogen, (b) alkyl, (c) chloroalkyl, (d) phenyl, (e) alkoxy or (f) alkylamino, with the alkyl substituents not specifically defined having one to five carbons; and X is oxygen or sulfur, which comprises reacting about an equivalent of a dialkyl phosphite or thionophosphite of the formula $$(R_1O)(R_2O)P(X)H$$

wherein R₁, R₂ and X have the meanings given above, with about an equivalent weight of a 3-isothiazolone of the structural formula

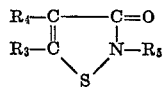

wherein R₃, R₄ and R₅ have the meanings given above, at a temperature range of 0–100° C., in the presence of about 0.5–5.0 mole percent of a basic catalyst.

2. A method according to claim 1 wherein X of said formula is oxygen.

3. A method according to claim 2 wherein R₁ and R₂ are alkyl of 1 to 5 carbon atoms.

4. A method according to claim 3 wherein R₃ is hydrogen.

5. A method according to claim 4 wherein R₄ is hydrogen.

6. A method according to claim 4 wherein R₄ is methyl.

7. A method according to claim 1 wherein R₅ is alkyl of 1 to 12 carbon atoms.

8. A method according to claim 1 wherein R₅ is the —C(O)R₆ group.

9. A method according to claim 8 wherein R₆ is hydrogen.

10. A method according to claim 5 for preparing cis-3-dimethoxyphosphorylthio-N-ethylacrylamide.

11. A method according to claim 5 for preparing cis-3-dimethoxyphosphorylthio-N-formylacrylamide.

12. A method according to claim 5 for preparing cis-3-(ethoxy)methoxyphosphorylthio-N-formylacrylamide.

13. A method according to claim 6 for preparing cis-3-dimethoxyphosphorylthio-2-methyl-N-ethylacrylamide.

14. A method according to claim 1 wherein the basic catalyst is selected from the group consisting of tertiary amines, alkali metal alkoxides, alkali metal carbonates and alkali metal hydroxides.

15. A method according to claim 1 wherein the basic catalyst is an organic base.

16. A method according to claim 1 wherein the basic catalyst is a tertiary amine.

17. A method according to claim 1 wherein the basic catalyst is triethylamine.

References Cited

UNITED STATES PATENTS

| 2,875,231 | 2/1959 | McConnell et al. | 260—970 |
| 2,875,232 | 2/1959 | McConnell et al. | 260—970 |
| 3,297,796 | 1/1967 | Smith et al. | 260—970 X |

U.S. Cl. X.R.

260—247.1, 306.7, 940, 941, 942, 943; 424—210, 212

JOSEPH P. BRUST, Primary Examiner